(12) United States Patent
Kaiser

(10) Patent No.: US 8,702,110 B2
(45) Date of Patent: Apr. 22, 2014

(54) APPARATUS FOR TRANSPORTING STAGE EQUIPMENT

(75) Inventor: Ingo Kaiser, Luenen (DE)

(73) Assignee: Late Night Concepts Veranstaltungsproduktion GmbH & Co. KG, Werne (DE)

(*) Notice: Subject to any disclaimer, the term of this patent is extended or adjusted under 35 U.S.C. 154(b) by 35 days.

(21) Appl. No.: 13/266,470

(22) PCT Filed: Apr. 28, 2010

(86) PCT No.: PCT/EP2010/002596
§ 371 (c)(1),
(2), (4) Date: Dec. 8, 2011

(87) PCT Pub. No.: WO2010/124852
PCT Pub. Date: Nov. 4, 2010

(65) Prior Publication Data
US 2012/0091672 A1 Apr. 19, 2012

(30) Foreign Application Priority Data
Apr. 28, 2009 (DE) .................. 20 2009 006 263 U

(51) Int. Cl.
*B62B 1/04* (2006.01)
(52) U.S. Cl.
USPC .......................................... 280/30; 280/47.34
(58) Field of Classification Search
USPC ................ 280/47.34–47.35, 79.2–79.11, 30; 211/183–188, 135; 312/328, 350, 257, 312/263, 297
See application file for complete search history.

(56) References Cited

U.S. PATENT DOCUMENTS

| 1,367,672 | A | | 2/1921 | Smith |
| 1,957,656 | A | * | 5/1934 | Langenkamp et al. ....... 211/182 |
| 6,550,880 | B2 | * | 4/2003 | Reuter ....................... 312/265.3 |

FOREIGN PATENT DOCUMENTS

| BE | 419 393 | 2/1937 |
| DE | 20 2004 007 736 | 9/2004 |
| DE | 20 2004 007736 | 9/2004 |
| EP | 0 586 088 | 8/1997 |
| EP | 1 623 936 | 2/2006 |
| GB | 2 169 873 | 7/1986 |
| GB | 2 236 719 | 4/1991 |

OTHER PUBLICATIONS

International Search Report of PCT/EP2010/002596, date of mailing Sep. 17, 2010.

* cited by examiner

*Primary Examiner* — John Walters
*Assistant Examiner* — James Triggs
(74) *Attorney, Agent, or Firm* — Collard & Roe, P.C.

(57) ABSTRACT

The invention relates to an apparatus for transporting and/or storing stage equipment, in particular exhibition materials, comprising a box-shaped stacking container which can be moved on running rollers (11) and which has a frame connected to running roller carriers (10) and a base (4), two side walls (5), a front wall (6), a rear wall (7) and a top (8). The frame (1) is formed by profiled rods (2) joined to one another at the corners of the container and running along the edges of the container and is stiffened by corner stiffening plates (3) inserted into the corners of the frame, wherein the profiled rods in each case form mounting frames, into which the base (4), the two side walls (5), the front wall (6), the rear wall (7) and the top (8) of the container are inserted.

15 Claims, 7 Drawing Sheets

Figure 1:
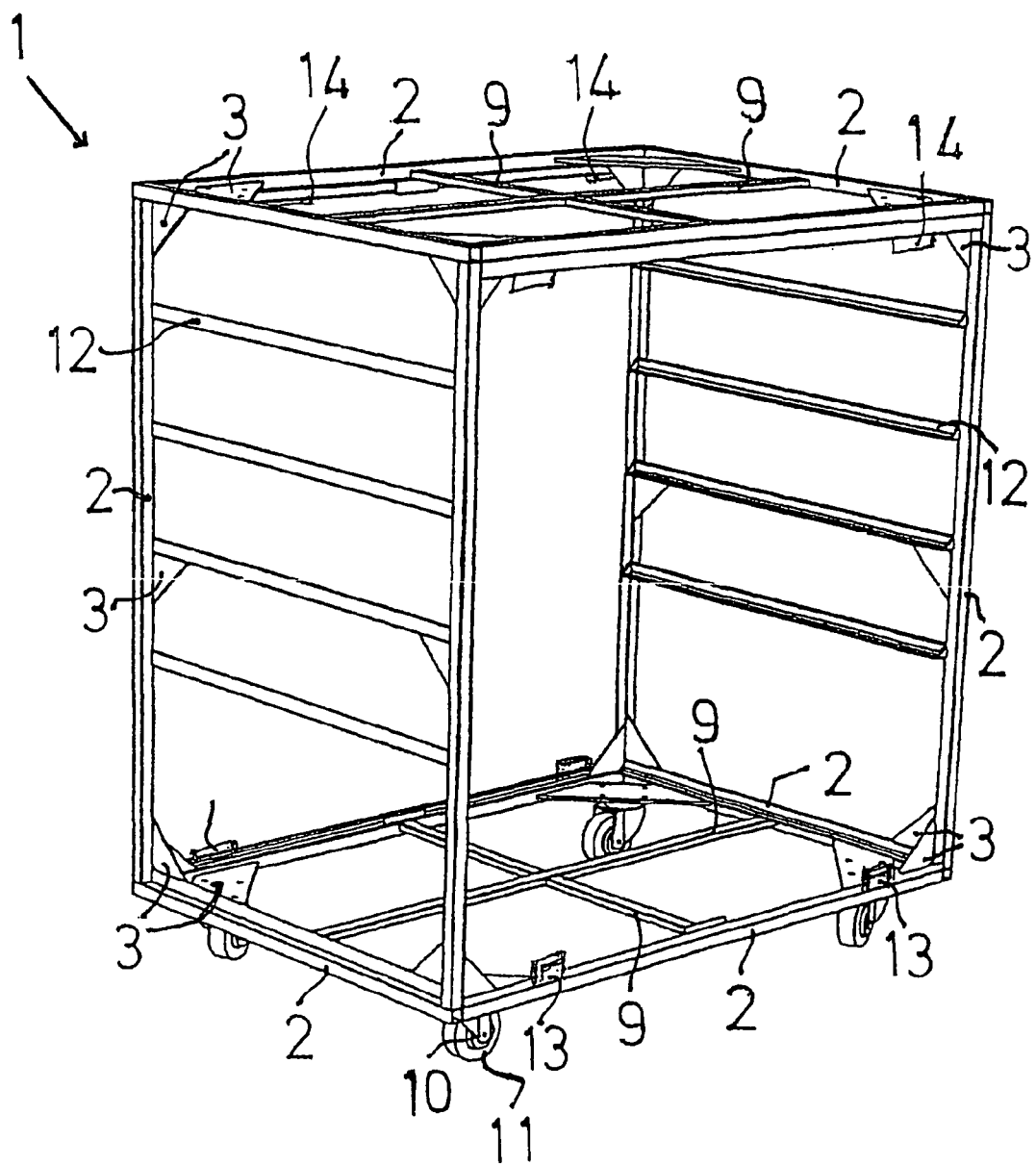

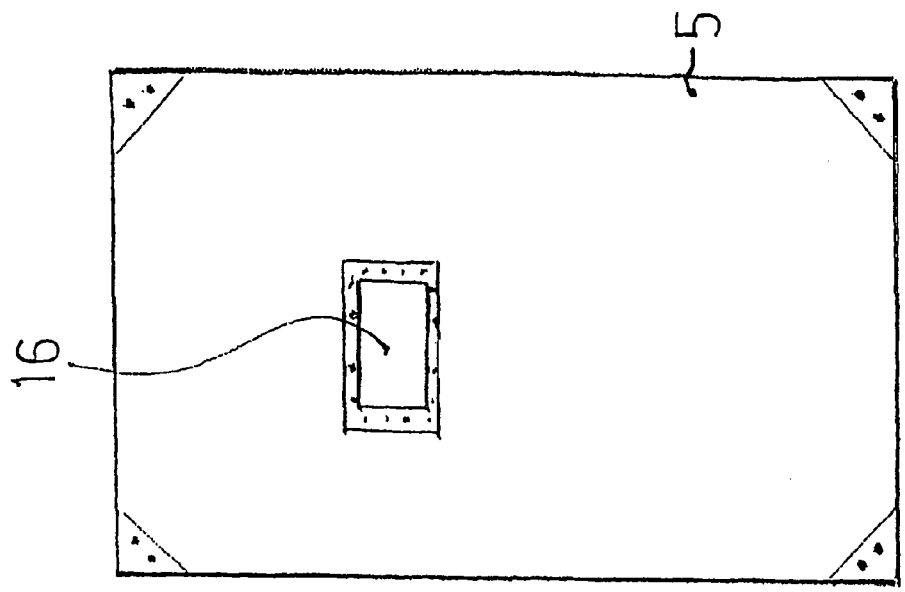
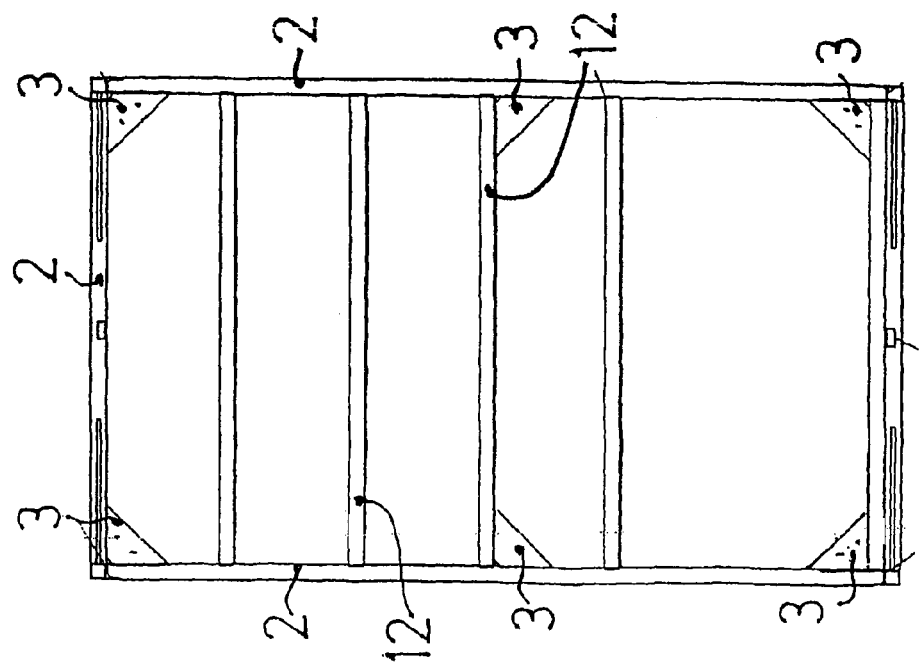

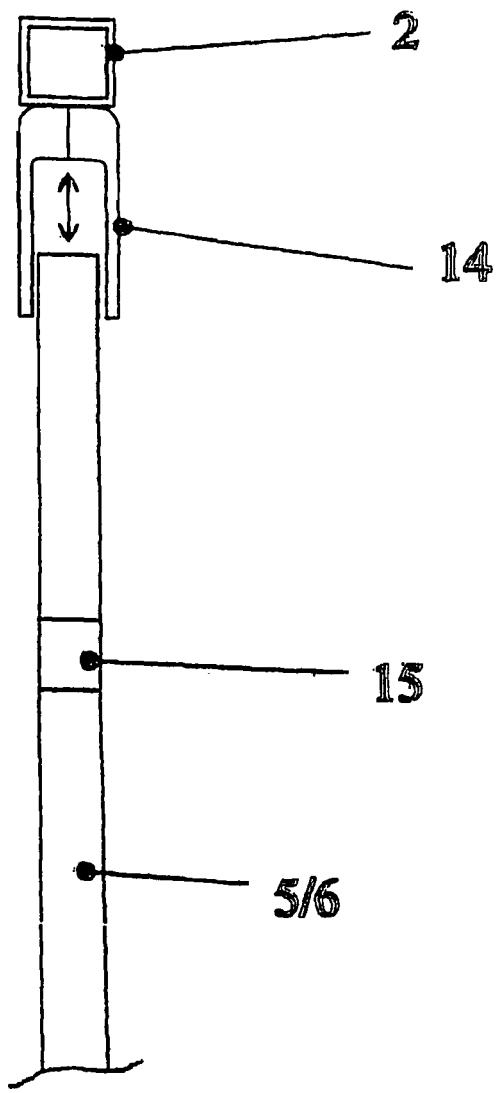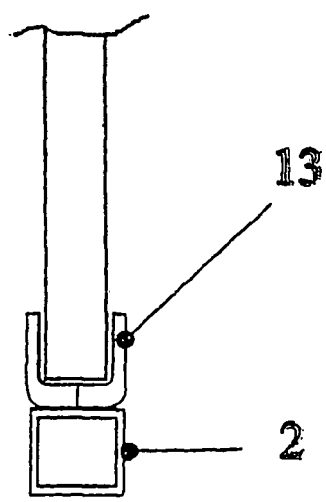
FIG. 5

APPARATUS FOR TRANSPORTING STAGE EQUIPMENT

CROSS REFERENCE TO RELATED APPLICATIONS

This application is the National Stage of PCT/EP2010/002596 filed on Apr. 28, 2010 which claims priority under 35 U.S.C. §119 of German Application No. 20 2009 006 263.5 filed on Apr. 28, 2009, the disclosure of which is incorporated by reference. The international application under PCT article 21(2) was not published in English.

The invention relates to a device for transport and/or storage of stage equipment, particularly of event-technology materials, consisting of a block-shaped stacking container that can be moved on casters, which container has a frame connected with the caster supports as well as a bottom, two side walls, a front wall, a rear wall, and a lid.

A device is known, for example, from EP 0 586 088 B1. In the case of the known device, the stacking container that can be moved on casters is configured as a large-format trunk, closed on all sides, made of plastic, which has walls made of plastic, which are configured to be thick and hollow, for protection against impacts from the outside, and are reinforced with reinforcement ribs, which walls are molded onto a lower part reinforced with a reinforcement frame—which part is also made of plastic. The caster supports are affixed to the reinforcement frame, which consists of perforated metal strips that are molded into the lower part. It is evident that this structure of the stacking container requires great production effort. Furthermore, the stacking container configured in this manner requires unnecessarily much stowage space, because of the thick hollow walls. Finally, in the case of this stacking container, the walls of the stacking container must carry the weight of the entire stack, and accordingly must be structured to be stable and heavy. Also, in the event of damage, such a trunk, which consists of plastic, can only be repaired with difficulty.

It is the task of the invention to create a device of the type stated initially, which has a light construction and is stable, and furthermore requires little stowage space, and is easy to repair.

To accomplish this task, the invention proposes, proceeding from the device of the type stated initially, that the frame is formed by profiled rods that run along the edges of the container and are connected with one another at the corners of the container, and by means of metal cover reinforcement sheets inserted into the corners of the frame, whereby the profiled rods form accommodation frames, in each instance, into which frames the bottom, the two side walls, the front wall, the rear wall, and the lid of the container are inserted.

In the stacking container according to the invention, only the frame, which consists of the steel profiles and the metal corner reinforcement sheets, has a supporting function. All the other parts, namely the bottom, the side walls, the front wall, the rear wall, and the lid, have no supporting function, but rather only a protective function, and therefore can be structured in accordance with this function, for example made of light plywood panels that are equipped to be water-resistant, or other materials that are even lighter. In the event of damage, these panels can also easily be replaced. In total, the stacking container according to the invention can be produced in particularly light, simple manner, because of the stable frame construction made of steel profiles; it requires little stowage space and is easy to repair.

A particularly preferred embodiment of the invention provides that the steel profiles of the frame, which run along the edges of the container, are configured as quadragonal profiles with corners rounded off on the outside. Such quadragonal profiles supplement the block shape of the container in the region of the edges, so that smooth surfaces of the container are obtained all around, to a great extent, which is of great benefit when the containers are placed in a tight arrangement next to one another and one on top of the other. Nevertheless, the edges that point toward the outside are not sharp-edged.

It is practical if the steel profiles of the frame are welded to one another at the corners of the container and to the metal corner reinforcement sheets that are disposed at the corners. Such a frame, in a welded construction, is extremely stable and has no disruptive projections that stand away toward the outside, as would be the case with screw connections or rivet connections.

For better support of the bottom and lid of the container, the accommodation frames for the bottom and the lid are additionally reinforced by means of the support profiles that extend over the surface region of the accommodation frame. In this connection, it is practical if two support profiles intersect in the center of the related accommodation frame.

Furthermore, it is provided that the accommodation frames for the side walls, provided with horizontally disposed L profiles that run parallel at a distance from one another, serve for intermediate bottoms, drawers, or special accessories that can be pushed into the container. Such intermediate bottoms, drawers, or special accessories subdivide the interior of the container in accordance with the requirements, or make it possible to fix the objects stored in the container in place within the container.

It is practical if the bottom, the side walls, the front wall, the rear wall, and the lid of the container consist of plywood panels that have been equipped to be water-resistant. Such plywood panels are light, impact-resistant, and water-resistant, and can be worked with simple working tools such as drills, jigsaws, or the like, which is particularly useful in repairs or in individual adaptation of the panels to special requirements.

It is practical if the side walls inserted into the lateral accommodation frames and the bottom inserted into the lower accommodation frame are screwed to the metal corner reinforcement sheets in order to fix them in place. Such a screw connection can easily be released, if necessary, in order to be able to replace the panels in simple manner, if necessary.

For stable displacement of the caster supports, these are screwed to metal corner reinforcement sheets of the lower accommodation frame. This screw connection also allows rapid replacement of the caster supports, if necessary. Because of the fact that the caster supports are directly connected with the frame, by way of the metal corner reinforcement sheets, the supporting forces of the caster supports are directly passed into the frame, without putting any stress on the walls of the container.

In order to keep all the walls free of the stresses caused by stacking when the containers are stacked on top of one another, it is provided that the lid that is inserted into the upper accommodation frame at the top leaves the metal corner reinforcement sheets of the upper accommodation frame free, in whole or in part, as a standing surface for the casters of a container that is stacked on top. In this way, it is ensured that all of the forces that occur during stacking put stress only on the frames, the casters and the caster supports, but not on the walls of the containers.

To hold the front wall or the rear wall in the related accommodation frame, it is provided that the front and the rear accommodation frame for the front wall and the rear wall, respectively, are provided with U profiles at the top and the bottom, between the free shanks of which, pointing to the frame center, the front wall or the rear wall, respectively, can be inserted for the purpose of holding them, whereby the free shanks of the lower U profiles are shorter than the free shanks of the upper U profiles. For insertion, the upper edge of the front wall or the rear wall, respectively, is pushed between the longer free shanks of the upper U profiles, and afterward, the lower edge of the front wall or of the rear wall, respectively, is lowered between the shanks of the lower U profiles, from above. In this manner, the front wall and the rear wall are locked in place in the installation position, by means of their own weight, during installation. For disassembly, first the lower edge of the front wall or the rear wall, respectively, is pulled out of the lower U profiles, and then the upper edge is pulled out of the upper profiles.

In order to ensure that the containers can easily be grasped by hand and moved, it is furthermore provided that the side walls are provided with handle openings that can be closed.

It is practical if a support frame that serves as a special accessory can be pushed into the horizontal shanks of the L profiles; this frame has support rods for suspending lights or cables, which rods run parallel to one another. Preferably, this support frame has two or four support rods.

Another special accessory consists of separate caster supports or table legs that can be screwed to the removable front wall or the rear wall. For this purpose, these are provided with corresponding screw holes. In this way, it is possible to produce rolling pallets or small tables from the side walls or rear walls, with a few hand movements, and this can be useful when setting up the stage. In this manner, the parts of the transport device are used as modules for other, useful utensils during stage construction.

Figure 3:
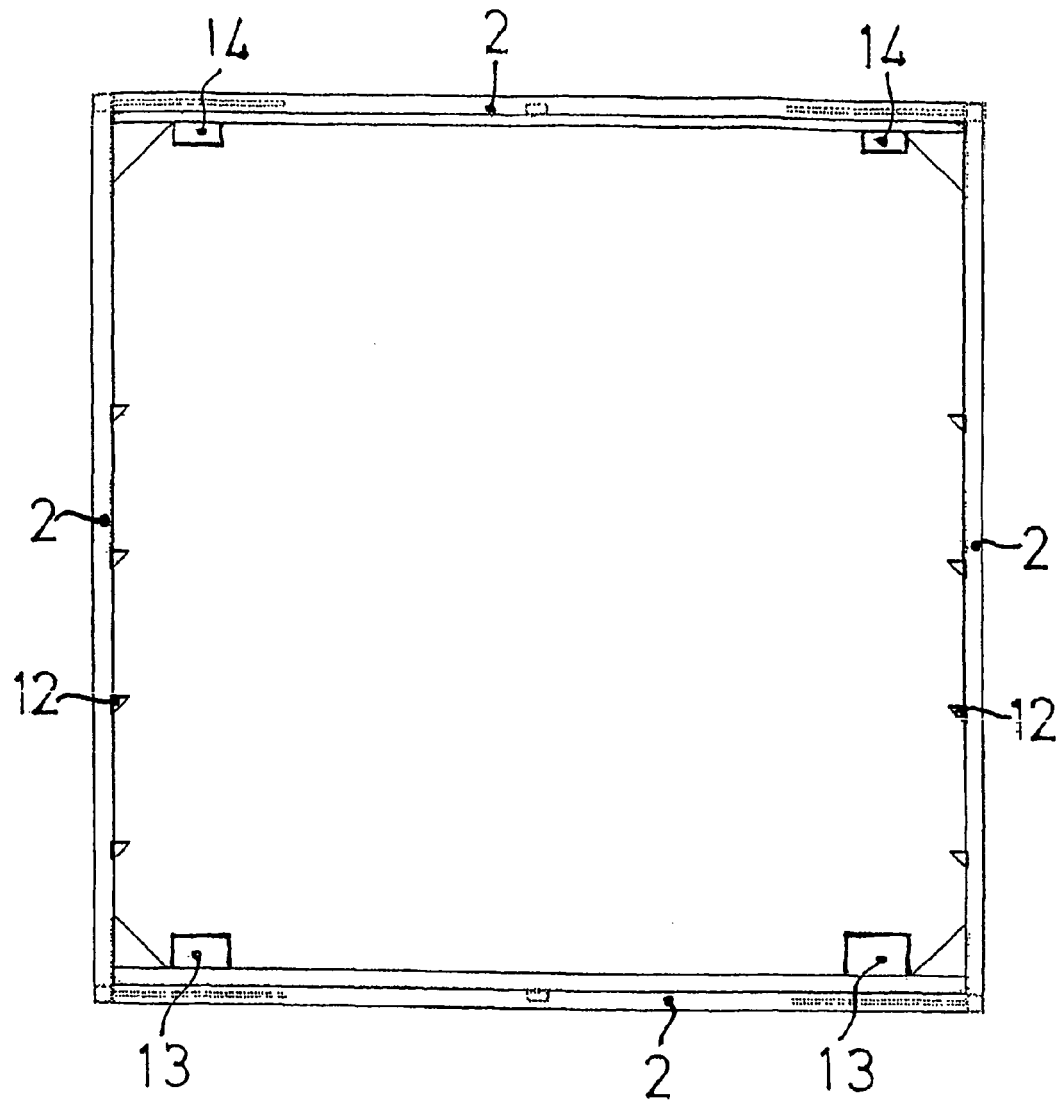
Figure 4:
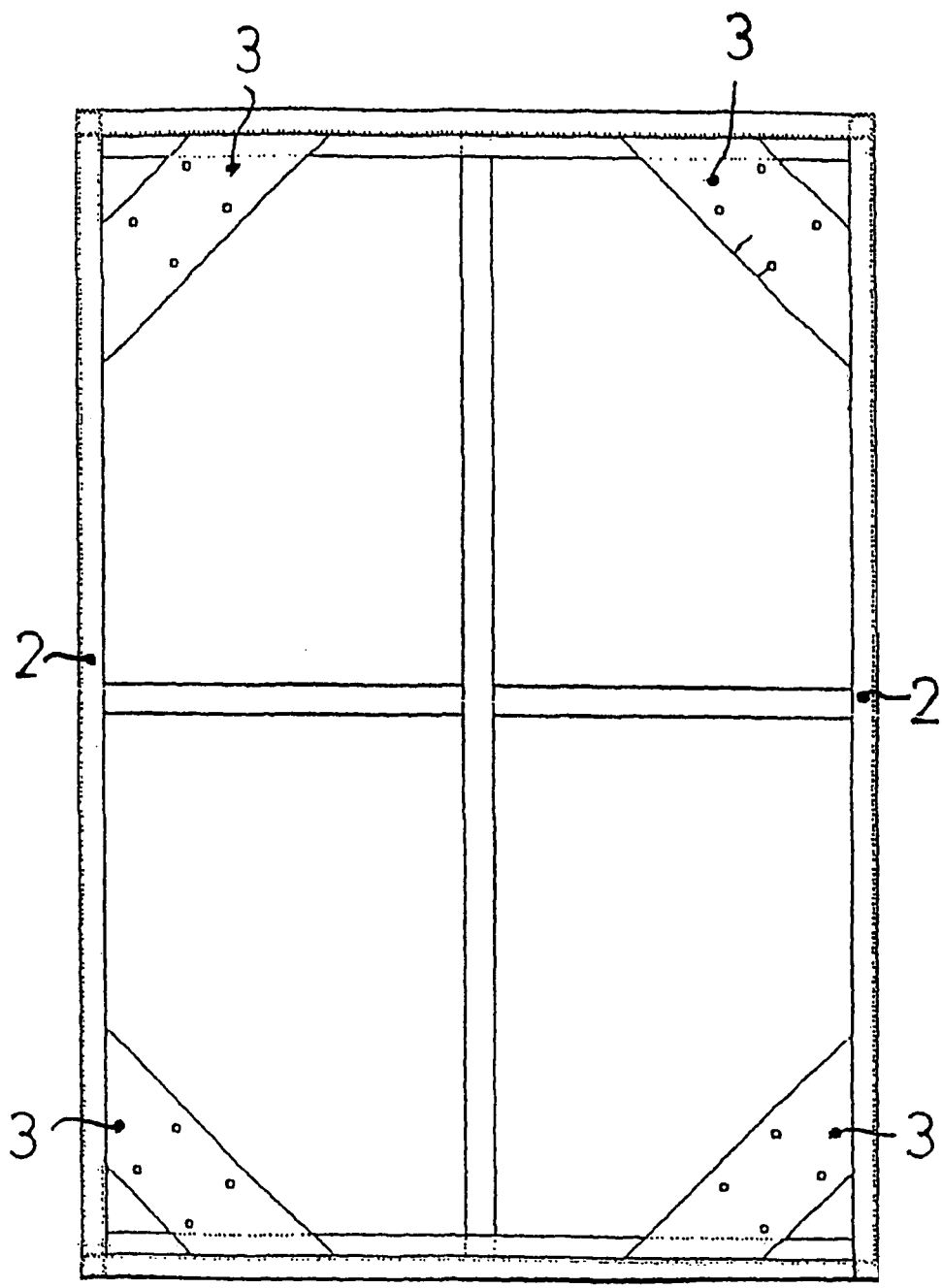
Figure 6:
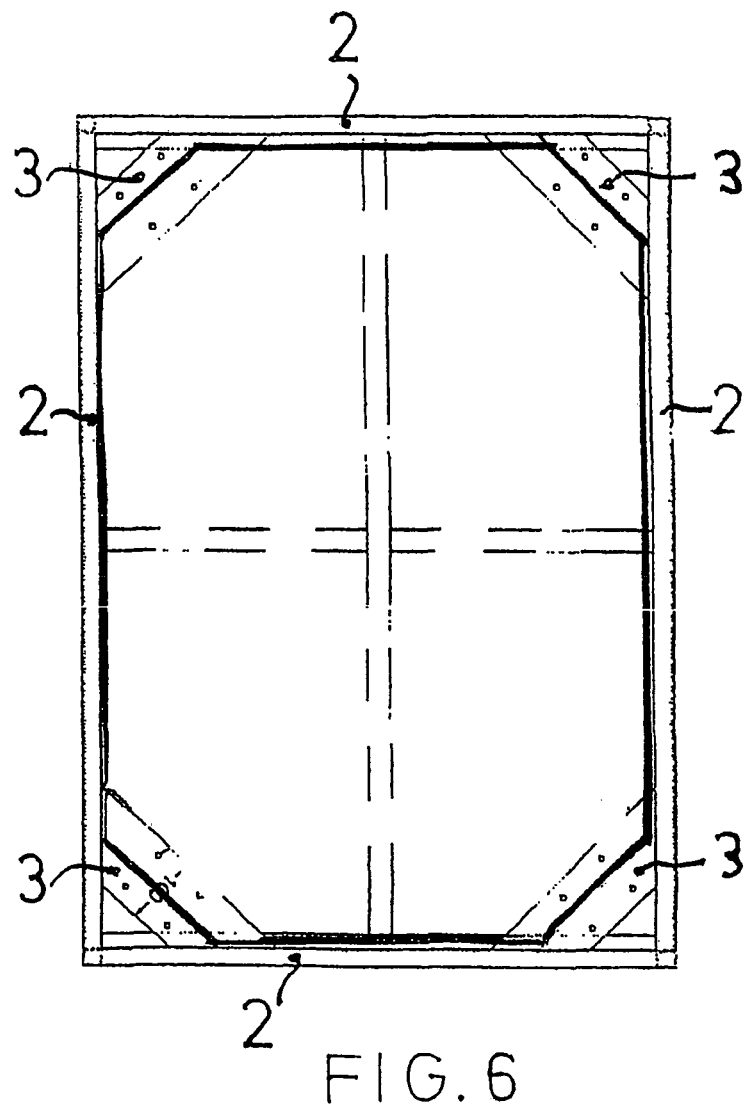
Figure 7:
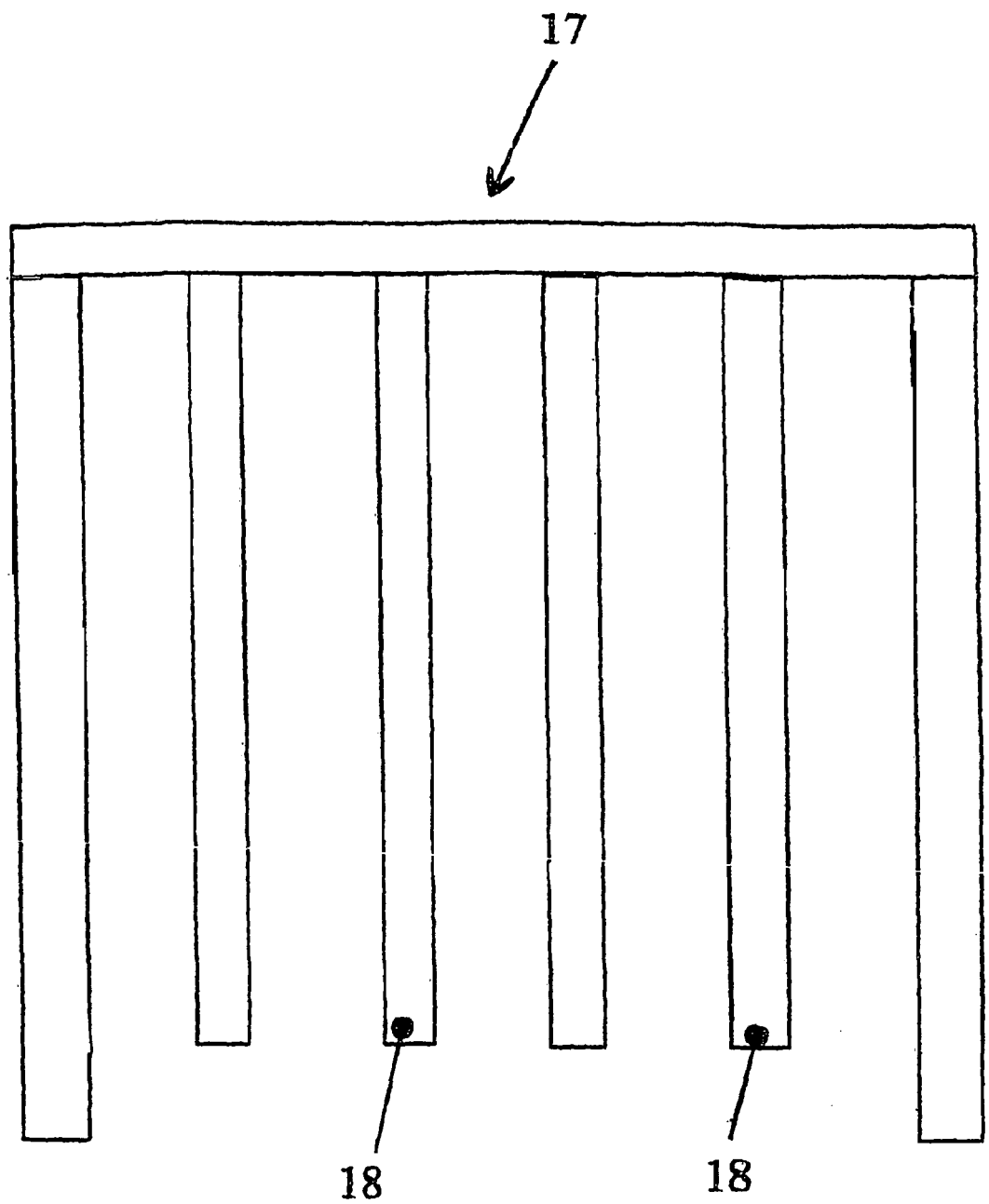

An exemplary embodiment of the invention will be explained in greater detail in the following, using the drawing. This shows:

FIG. 1: in perspective, the frame without a bottom, side walls, front wall, rear wall, and lid;

FIGS. 2a and 2b: a side view of FIG. 1, without casters and caster supports, as well as a front view of the side wall, before assembly;

FIG. 3: a front view or rear view, respectively, of FIG. 1, without casters and caster supports;

FIG. 4: a view of FIG. 1 from below, without casters and caster supports;

FIG. 5: the attachment means for the front wall or the rear wall, respectively, in section;

FIG. 6: a top view of the lid;

FIG. 7: a perspective view of special accessories.

In the drawing, the frame as a whole is indicated with the reference symbol 1. It consists of twelve profiled rods 2, which are welded to one another at their ends, to form the frame 1, which is block-shaped, as a whole. The individual profiled rods consist of steel and have a quadragonal cross-section with rounded-off corners, in each instance.

For reinforcement, metal corner reinforcement sheets 3 are welded into the corners of the frame 1; these are disposed, in each instance, in such a manner that room remains in the accommodation frames enclosed by four profiled rods 2, in each instance, for insertion of a bottom 4, of side walls 5, of front wall 6 and rear wall 7, as well as of a lid 8. In this connection, the accommodation frame for the bottom 4 and the accommodation frame for the lid 8 are reinforced, in each instance, by means of two support profiles 9 that extend over the surface region of these two accommodation frames and intersect in the center of the accommodation frame, in each instance. In this connection, these additional support profiles 9—just like the metal corner reinforcement sheets 3—are attached to the frame 1 in such a manner that the room that remains within the accommodation frame, in each instance, remains free for insertion of bottom 4 or lid 8, respectively. The bottom 4 is laid into the related accommodation frame from above, and screwed in place using screws, on the metal corner reinforcement sheets 3 and/or on the additional support profiles 9. Furthermore, four caster supports 10 with casters 11 are welded onto the metal corner reinforcement sheets 3 from below. The container can be moved on the floor on these casters 11.

Furthermore, the accommodation frames for the side walls 5 are welded to horizontally disposed L profiles 12 that run parallel to and at a distance from one another, the shanks of which, running horizontally, project into the interior of the container and serve as contact surfaces for intermediate bottoms, drawers, or special accessories that can be inserted into the interior of the container and are not shown in the drawing. These L profiles 12, too, are welded onto the frame 1 in such a manner that room for insertion of the side walls 5 remains within the lateral accommodation frames; these side walls are screwed to the metal corner reinforcement sheets 3 to attach them on the frame 1.

The lid 8 is laid into the upper accommodation frame from above, and attached to the additional support profiles 9 and/or to the metal corner reinforcement sheets 3. However, lid 8, at all four corners, leaves the metal corner reinforcement sheets 3 that are situated there clear, in whole or in part. These regions of the metal corner reinforcement sheets 3, which are left clear by the lid 8, serve as the standing surface for the casters 11 of a container stacked on top, the weight of which puts stress only on the frame 1, but not on the lid 8, in this manner.

The front and the rear accommodation frame for the front wall 6 and the rear wall 7, respectively, are provided with U profiles 13 and 14 that serve to attach front wall 6 and rear wall 7, respectively, at the top and the bottom, the free shanks of which profiles point toward the frame center. In this connection, the free shanks of the upper U profiles 13 are longer than the free shanks of the lower U profiles 14. The front wall 6 and the rear wall 7, respectively, are dimensioned in such a manner that their upper edge is surrounded by the shanks of the upper U profiles 13, when their lower edge lies on the base of the lower U profile 14. In this position of the front wall 6 and of the rear wall 7, respectively, however, so much distance remains between the upper edge and the base of the upper U profile 13 that the front wall 6 and the rear wall 7, respectively, can be lifted upward out of the lower U profiles 14. As a result of these dimensional conditions and the placement of the U profiles 13 and 14, on the one hand, and of the front wall 6 or the rear wall 7, respectively, on the other hand, these remain in the locked installation position under their own weight, from which they can be lifted out again, upward, without a tool. To simplify their handling during installation and removal, the front wall 6 and the rear wall 7, respectively, are provided with corresponding handle openings 15.

Similarly, the side walls 5 are provided with handle openings 16 that can be closed, in order to be better able to grip and move the container.

In place of the insertion bottoms or drawers, not shown, a support frame 17 can also be pushed into the L profiles 12 of the side walls, as a special accessory, which frame is provided with support rods 18 that run parallel to one another, on which cables, lamps, etc. can be suspended. The support frame 17 can optionally have two or four support rods 18.

If applicable, the removable front wall 6 and/or the removable rear wall 7 can also be provided with screw-on holes 19 for caster supports or table legs. In this way, it is possible to convert the removable front wall 6 or the rear wall 7, respectively, into a rolling pallet or a table, with a few hand motions.

The invention claimed is:

1. A device for transport or storage of stage equipment, comprising a block-shaped stacking container movable on casters, which container has a frame connected with caster supports as well as a bottom, two side walls, a front wall, a rear wall, and a lid, wherein the frame is formed by profiled rods that run along the edges of the container and are connected with one another at the corners of the container, and via metal cover reinforcement sheets inserted into the corners of the frame, and the profiled rods form accommodation frames, in each instance, into which frames the bottom, the two side walls, the front wall, the rear wall, and the lid of the container are inserted, wherein the front and the rear accommodation frame for the front wall and the rear wall, respectively, are provided with U profiles, at the top and the bottom, between the free shanks of which, pointing to the center of the frame, the front wall or the rear wall, respectively, are insertable for the purpose of holding the frame, wherein the free shanks of the lower U profiles are shorter than the free shanks of the upper U profiles.

2. The device according to claim 1, wherein the profiled rods of the frame that run along the edges of the container are configured as quadragonal profiles made of steel, with corners that are rounded off on the outside.

3. The device according to claim 1, wherein the profiled rods of the frame are welded to one another at the corners of the container and to the metal corner reinforcement sheets disposed at the corners.

4. The device according to claim 1, wherein the accommodation frames for the bottom and the lid are additionally reinforced by support profiles that extend over the surface region of the accommodation frame.

5. The device according to claim 4, wherein two support profiles intersect in the center of the related accommodation frame.

6. The device according to claim 1, wherein the accommodation frames for the side walls are provided with horizontally disposed L profiles that run parallel to and at a distance from one another, the shanks of which, running horizontally, serve as contact surfaces for intermediate bottoms, drawers, or special accessories that are insertable into the container.

7. The device according to claim 1, wherein the bottom, the side walls, the front wall, the rear wall, and the lid of the container comprise plywood panels equipped to be water-resistant.

8. The device according to claim 1, wherein the side walls inserted into the lateral accommodation frames and the bottom inserted into the lower accommodation frame are screwed to the metal corner reinforcement sheets, in each instance.

9. The device according to claim 1, wherein the caster supports are screwed to the metal corner reinforcement sheets of the lower accommodation frame.

10. The device according to claim 1, wherein the lid, inserted into the upper accommodation frame from above, leaves the metal corner reinforcement sheets of the upper accommodation frame clear, in whole or in part, as a standing surface for the casters of a container stacked on top.

11. The device according to claim 1, wherein the side walls are provided with closable handle openings.

12. The device according to claim 1, wherein a support frame is pushable onto the horizontal shanks of the L profiles, which frame is provided with support rods that run parallel to one another, for suspending lamps, cables, or the like.

13. The device according to claim 12, wherein the support frame has two support rods.

14. The device according to claim 12, wherein the support frame has four support rods.

15. The device according to claim 1, wherein the removable front wall or rear wall is provided with screw-on holes for attaching caster supports or table legs.

\* \* \* \* \*

UNITED STATES PATENT AND TRADEMARK OFFICE
CERTIFICATE OF CORRECTION

PATENT NO. : 8,702,110 B2 Page 1 of 1
APPLICATION NO. : 13/266470
DATED : April 22, 2014
INVENTOR(S) : Ingo Kaiser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 77 days.

Signed and Sealed this
Twenty-ninth Day of September, 2015

Michelle K. Lee
*Director of the United States Patent and Trademark Office*